(12) United States Patent
Matthijssen et al.

(10) Patent No.: US 8,524,806 B2
(45) Date of Patent: Sep. 3, 2013

(54) PROFILE EXTRUSION METHOD, ARTICLE, AND COMPOSITION

(75) Inventors: Johannes GM Matthijssen, Moerstraten (NL); Johannes Everardus Fortuyn, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 328 days.

(21) Appl. No.: 13/024,452

(22) Filed: Feb. 10, 2011

(65) Prior Publication Data
US 2012/0208922 A1   Aug. 16, 2012

(51) Int. Cl.
*C10C 3/02*   (2006.01)

(52) U.S. Cl.
USPC .......................................... 523/307; 524/494

(58) Field of Classification Search
USPC .......................................... 523/307; 524/494
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,700,478 A | 10/1972 | Bingham |
| 4,391,646 A | 7/1983 | Howell |
| 5,132,365 A | 7/1992 | Gallucci |
| 5,468,530 A * | 11/1995 | Gotz et al. .................. 428/36.4 |
| 5,534,600 A | 7/1996 | Bailly et al. |
| 5,629,062 A | 5/1997 | Ejiri et al. |
| 5,710,212 A | 1/1998 | Asano et al. |
| 5,727,356 A | 3/1998 | Ensinger et al. |
| 6,357,802 B1 | 3/2002 | Nozato et al. |
| 6,531,222 B1 | 3/2003 | Tanaka et al. |
| 6,593,411 B2 | 7/2003 | Koevoets et al. |
| 6,914,024 B2 | 7/2005 | Anderson |
| 7,226,963 B2 | 6/2007 | Koevoets |
| 7,413,684 B2 | 8/2008 | Fishburn et al. |
| 2006/0234034 A1 | 10/2006 | Tschech et al. |
| 2009/0326113 A1 | 12/2009 | Fortuyn et al. |

FOREIGN PATENT DOCUMENTS

| | | |
|---|---|---|
| EP | 0574229 B1 | 4/1997 |
| GB | 1291838 | 10/1972 |

OTHER PUBLICATIONS

Written Opinion of the International Searching Authority; International Application No. PCT/IB2012/50171; International filing date Jan. 13, 2012; 7 pages.
International Search Report; International Application No. PCT/IB2012/050171; International filing date Jan. 13, 2012; Date of Mailing Jun. 4, 2012; 4 pages.
U.S. Appl. No. 12/768,989, filed Apr. 28, 2010.
Zweifel, "Plastics Additives Handbook", 5th Edition, 2001, p. 540, Hanswer Gardner Publications, Inc.

* cited by examiner

*Primary Examiner* — Edward Cain
(74) *Attorney, Agent, or Firm* — Cantor Colburn LLP (57) ABSTRACT

A glass fiber-filled poly(arylene ether)/polyamide composition exhibits reduced die build-up during profile extrusion. The composition includes specific amounts of polyamide, poly(arylene ether), glass fibers, and polypropylene. The reduced die build-up means that the profile extrusion equipment needs to be shut down and cleaned less often, resulting in a substantial productivity improvement.

28 Claims, 1 Drawing Sheet

FIG. 1

FIG. 2 ps://www.w3.org/TR/REC-html40/loose.dtd">
PROFILE EXTRUSION METHOD, ARTICLE, AND COMPOSITION

BACKGROUND OF THE INVENTION

Poly(arylene ether)s have been blended with polyamides to provide compositions having a wide variety of beneficial properties such as heat resistance, chemical resistance, impact strength, hydrolytic stability, and dimensional stability. Glass fiber-filled poly(arylene ether)-polyamide blends have been used to mold insulation materials that are incorporated into door and window frames in order to decrease their thermal conductivity. See, for example, U.S. Pat. No. 5,727,356 to Ensinger et al., and U.S. Patent Application Publication No. US 2006/0234034 A1 of Tschech et al. These insulation materials provide significant improvements in the energy efficiency of the doors and windows into which they are incorporated. However, existing grades of glass fiber-filled poly(arylene ether)-polyamide blends have sometimes caused undesirable build-up of material on the extrusion die. This so-called "beard growth" phenomenon requires the profile extruder to be shut down for cleaning, thereby reducing the productivity of the equipment. There is therefore a need for improved glass fiber-filled poly(arylene ether)-polyamide blends that show a reduced tendency toward beard growth during profile extrusion.

BRIEF DESCRIPTION OF THE INVENTION

One embodiment is a method of profile extrusion, comprising: extruding through a die a thermoplastic composition having a temperature of about 275 to about 310° C.; and cooling the extruded composition to form an extruded thermoplastic article; wherein the thermoplastic composition comprises the product of melt blending about 35 to about 55 weight percent of a polyamide, about 30 to about 50 weight percent of a poly(arylene ether), about 5 to about 15 weight percent of glass fibers, and about 0.5 to about 4 weight percent of a polypropylene; wherein all weight percents are based on the total weight of the thermoplastic composition unless a different weight basis is specified.

Another embodiment is a profile-extruded article produced by the above-described method.

Another embodiment is a thermoplastic composition, comprising: about 35 to about 55 weight percent of a polyamide, about 30 to about 50 weight percent of a poly(arylene ether), about 5 to about 15 weight percent of glass fibers, and about 0.5 to about 4 weight percent of a polypropylene; wherein all weight percents are based on the total weight of the thermoplastic composition unless a different weight basis is specified.

Another embodiment is a profile-extruded article comprising the above-described composition.

These and other embodiments are described in detail below.

DETAILED DESCRIPTION OF THE INVENTION

In their research directed to reducing the formation of "beard growth" during profile extrusion of glass fiber-filled polyamide/poly(arylene ether) compositions, the present inventors have surprisingly discovered that beard growth can be substantially reduced by the addition of a relatively small amount of polypropylene to the composition. This observation was unexpected given that polypropylene is not a conventional additive for polyamide/poly(arylene ether) compositions. And it is particularly surprising that the presently preferred polypropylene is a high molecular weight polypropylene that is distinguished from the so-called "polypropylene waxes" that have been disclosed but rarely used as lubricants for thermoplastic compositions. See H. Zweifel, ed., "Plastics Additives Handbook, $5^{th}$ Edition", Cincinnati: Hanser Gardner Publications, Inc. (2001), page 540.

One embodiment is a method of profile extrusion, comprising: extruding through a die a thermoplastic composition having a temperature of about 275 to about 310° C.; and cooling the extruded composition to form an extruded thermoplastic article; wherein the thermoplastic composition comprises the product of melt blending about 35 to about 55 weight percent of a polyamide, about 30 to about 50 weight percent of a poly(arylene ether), about 5 to about 15 weight percent of glass fibers, and about 0.5 to about 4 weight percent of a polypropylene; wherein all weight percents are based on the total weight of the thermoplastic composition unless a different weight basis is specified.

The method is generally applicable to profile extrusion and can be used to fabricate sheets, pipes, door frames, window frames, furniture trim, furniture frames, automotive trim, and the like. The method can utilize apparatus and methods of profile extruding poly(arylene ether) compositions, including those described in, for example, U.S. Pat. No. 5,468,530 to Gotz et al., U.S. Pat. No. 5,629,062 to Ejiri et al., and U.S. Pat. No. 6,357,802 to Nozato et al.

The method includes the step of extruding through a die a thermoplastic composition having a temperature of about 275 to about 310° C. Within this range, the thermoplastic composition temperature can be about 280 to about 305° C., specifically about 285° C. to about 300° C., more specifically about 285 to about 295° C.

The method further includes the step of cooling the extruded composition to form an extruded thermoplastic article. Cooling methods include, for example, cooling in a flow of circulating gas such as air, or cooling in a water bath, or cooling on a steel cooling belt such as those commercially available from Sandvik Process Systems LLC, Totowa, N.J., U.S.A.

An important advantage of the method is the reduction of beard growth that would otherwise require the extruder to be stopped for cleaning the die. For example, in some embodiments, extrusion can be conducted for greater than six hours, or greater than eight hours without the need to shut down the extruder.

The method utilizes a thermoplastic composition comprises the product of melt blending specific amounts of a polyamide, a poly(arylene ether), glass fibers, and a polypropylene.

The thermoplastic composition comprises a polyamide. Polyamides, also known as nylons, are characterized by the presence of a plurality of amide (—C(O)NH—) groups and are described in U.S. Pat. No. 4,970,272 to Gallucci. Suitable polyamides include polyamide-6, polyamide-6,6, polyamide-4, polyamide-4,6, polyamide-12, polyamide-6,10, polyamide-6,9, polyamide-6,12, amorphous polyamides, polyamide-6/6T and polyamide-6,6/6T with triamine contents below 0.5 weight percent, polyamide-9T, and combinations thereof. In some embodiments, the polyamide comprises a polyamide-6,6. In some embodiments, the polyamide comprises a polyamide-6 and a polyamide-6,6. In some embodiments, the polyamide or combination of polyamides has a melting point ($T_m$) greater than or equal to 171° C. When the polyamide comprises a super tough polyamide, that is, a rubber-toughened polyamide, the composition may or may not contain a separate impact modifier.

Polyamides can be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamides are commercially available from a variety of sources.

Polyamides having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent solution in 96 weight percent sulfuric acid in accordance with ISO 307. The polyamide can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 weight percent solution in 96 weight percent sulfuric acid.

In some embodiments, the polyamide comprises a polyamide having an amine end group concentration greater than or equal to 35 micro equivalents amine end group per gram of polyamide (µeq/g) as determined by titration with HCl. The amine end group concentration can be greater than or equal to 40 µeq/g, or, more specifically, greater than or equal to 45 µeq/g Amine end group content can be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The thermoplastic composition comprises the polyamide in an amount of about 35 to about 55 weight percent, based on the total weight of the composition. Within this range, the polyamide amount can be about 40 to about 50 weight percent, specifically about 42 to about 48 weight percent.

The thermoplastic composition comprises a poly(arylene ether). Suitable poly(arylene ether)s include those comprising repeating structural units having the formula wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(arylene ether) has an intrinsic viscosity of 0.3 to 0.55 deciliter per gram measured at 25° C. in chloroform. Specifically, the poly(arylene ether) intrinsic viscosity can be 0.35 to 0.5 deciliter per gram, more specifically 0.35 to 0.46 deciliter per gram.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). In some embodiments, the poly(arylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

The thermoplastic composition comprises the poly(arylene ether) in an amount of about 30 to about 50 weight percent, based on the total weight of the thermoplastic composition. Within this range, the poly(arylene ether) amount can be about 35 to about 45 weight percent, more specifically about 37 to about 47 weight percent.

In some embodiments, the poly(arylene ether) and the polyamide are used in a weight ratio of about 0.5:1 to about 1.2:1, specifically about 0.8:1 to about 1.2:1, more specifically about 1:1 to about 1.2:1.

In some embodiments, a compatibilizing agent is used to facilitate formation of a compatibilized blend of the polyamide and the poly(arylene ether). As used herein, the term "compatibilizing agent" refers to a polyfunctional compound that interacts with the poly(arylene ether), the polyamide, or both. This interaction can be chemical (for example, grafting) and/or physical (for example, affecting the surface characteristics of the dispersed phases). In either instance the resulting polyamide-poly(arylene ether) blend exhibits improved compatibility, particularly as evidenced by enhanced impact strength, mold knit line strength, and/or tensile elongation. As used herein, the expression "compatibilized blend" refers to compositions that have been physically and/or chemically compatibilized with a compatibilizing agent, as well as blends of poly(arylene ether)s and polyamides that are physically compatible without such agents (as, for example, from compatibility-enhancing dibutylaminomethyl substituents on the poly(arylene ether)).

Examples of compatibilizing agents that can be employed include liquid diene polymers, epoxy compounds, oxidized polyolefin wax, quinones, organosilane compounds, polyfunctional compounds, functionalized poly(arylene ether)s, and combinations thereof. Compatibilizing agents are further described in U.S. Pat. No. 5,132,365 to Gallucci, and U.S. Pat. No. 6,593,411 and U.S. Pat. No. 7,226,963 to Koevoets et al.

In some embodiments, the compatibilizing agent comprises a polyfunctional compound. Polyfunctional compounds that can be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing the —OH group(s) of the above unsaturated alcohols with —$NH_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an alkyl, aryl, acyl or carbonyl dioxy group and (b) at least two groups each of which can be the same or different selected from carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula:

wherein R' is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR) is alpha or beta to a carbonyl group and at least two carbonyl groups are separated by 2 to 6 carbon atoms.

Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic acid, chloroformyl succinic anhydride, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The foregoing compatibilizing agents can be added directly to the melt blend or pre-reacted with either or both of the poly(arylene ether) and the polyamide, as well as with any other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with and consequently functionalize the poly(arylene ether). For example, the poly(arylene ether) can be pre-reacted with maleic anhydride to form an anhydride-functionalized poly(arylene ether) that has improved compatibility with the polyamide compared to a non-functionalized poly(arylene ether).

When a compatibilizing agent is employed in the preparation of the compatibilized polyamide-poly(arylene ether) composition, the amount used will be dependent upon the specific compatibilizing agent chosen and the specific polymeric system to which it is added. In some embodiments, the compatibilizing agent amount is about 0.1 to about 1 weight percent, specifically about 0.2 to about 0.8 weight percent, more specifically about 0.3 to about 0.6 weight percent, based on the total weight of the thermoplastic composition.

In addition to the polyamide and the poly(arylene ether), the thermoplastic composition comprises a polypropylene. As used herein, the term "polypropylene" refers to a polymer comprising at least 95 weight percent, based on the weight of the polypropylene, of repeating units derived from propylene (i.e., —$CH_2$—$CH(CH_3)$— units). In some embodiments, the polypropylene comprises at least 98 weight percent, based on the weight of the polypropylene, of repeating units derived from propylene. When the polypropylene is a copolymer of propylene and another copolymerizable monomer, the other copolymerizable monomer can be, for example, ethylene, a $C_4$-$C_{12}$ alkene, a $C_1$-$C_6$-alkyl acrylate, a $C_1$-$C_6$-alkyl methacrylate, or a mixture of two or more of the foregoing monomers. In some embodiments, the polypropylene is a homopolymer of propylene. The polypropylene can be syndiotactic, isotactic, or atactic. In some embodiments, the polypropylene is atactic.

In some embodiments, the polypropylene has a weight average molecular weight of at least 15,000 atomic mass units. In some embodiments, the weight average molecular weight is 15,000 to about 1,000,000 atomic mass units, specifically about 20,000 to about 500,000 atomic mass units, more specifically about 30,000 to about 300,000 atomic mass units. In these embodiments, the polypropylene is a high molecular weight species that is distinguished from low molecular weight "polypropylene waxes", which have been disclosed as lubricants for thermoplastics but characterized as "lack[ing] a clearly defined application profile in the processing of plastics". H. Zweifel, ed., "Plastics Additives Handbook, 5$^{th}$ Edition", Cincinnati: Hanser Gardner Publications, Inc., page 540 (2001).

The thermoplastic composition comprises the polypropylene in an amount of about 0.5 to about 4 weight percent, based on the total weight of the thermoplastic composition. Within this range, the polypropylene amount can be about 1 to about 3 weight percent, specifically about 1.5 to about 2 weight percent.

In addition to the polyamide, the poly(arylene ether), and the polypropylene, the thermoplastic composition comprises glass fibers. Suitable glass fibers include those based on E, A, C, ECR, R, S, D, and NE glasses, as well as quartz. The glass fiber can have a diameter of about 2 to about 30 micrometers, specifically about 5 to about 25 micrometers, more specifically about 10 to about 15 micrometers. The length of the glass fibers before compounding can be about 2 to about 7 millimeters, specifically about 3 to about 5 millimeters. The glass fiber can, optionally, include a so-called adhesion promoter to improve its compatibility with the polyamide, the poly(arylene ether), or both. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville. The composition comprises the glass fibers in an amount of about 5 to about 15 weight percent, specifically about 7 to about 13 weight percent, more specifically about 9 to about 11 weight percent, based on the total weight of the thermoplastic composition.

The composition can, optionally, include hollow glass beads in addition to the glass fibers. The hollow glass beads can have a volume-average diameter of about 20 to about 60 micrometers, specifically about 25 to about 55 micrometers, more specifically about 30 to about 50 micrometers, still more specifically about 35 to about 45 micrometers. Volume-average diameter can be determined using conventional particle sizing techniques, including microscopy. Nominal average diameters of hollow glass beads supplied by 3M are determined according to test method 3M QCM 193.0. The hollow glass beads can have a true density of about 0.3 to about 0.5 grams per milliliter, specifically about 0.35 to about 0.45 grams per milliliter, more specifically about 0.35 to about 0.4 grams per milliliter. The term "true density" corresponds to the density of a single glass bead and is contrasted with the bulk density of the glass beads, which is dependent on packing. Nominal true densities of hollow glass beads supplied by 3M are determined according to test method 3M QCM 14.24.1. The hollow glass beads can have an isostatic crush strength of about 30 to about 60 megapascals, specifically about 35 to about 55 megapascals, more specifically about 35 to about 50 megapascals, still more specifically about 35 to about 45 megapascals, yet more specifically about 35 to about 40 megapascals. Isostatic crush strengths can be determined according to ASTM D3102-78(1982), "Practice for Determination of Isostatic Collapse Strength of Hollow Glass Microspheres". Nominal isostatic crush strengths of hollow glass beads supplied by 3M are determined according to test method 3M QCM 14.1.8. The hollow glass beads can, optionally, be surface treated to improve their compatibility with a polyamide-containing matrix. Suitable surface treatment agents include, for example, aminosilanes, epoxysilanes, and the like. When present, the surface treatment agents are typically used in a surface area coverage of about 0.5 to about 20 monolayers. Methods of preparing hollow glass beads are known and described, for example, in U.S. Pat. No. 3,700,478 to Bingham, U.S. Pat. No. 4,391,646 to Howell, U.S. Pat. No. 6,531,222 to Tanaka et al., and U.S. Pat. No. 6,914,024 to Anderson. Suitable hollow glass beads are also commercially available as, for example, Glass Bubbles K46, Glass Bubbles S38XHS, and Glass Bubbles S38HS, all from 3M. Surface-treated versions, including aminosilane-treated versions, of the foregoing hollow glass beads can also be used.

When present, the hollow glass bead can be used in an amount of about 0.5 to about 10 weight percent, based on the total weight of the thermoplastic composition. Within this range, the amount of hollow glass beads can be about 1 to about 8 weight percent, specifically about 2 to about 6 weight percent.

In addition to the polyamide, the poly(arylene ether), the polypropylene, and the glass fibers, the thermoplastic composition can, optionally, further include additional components. For example, in some embodiments, the thermoplastic composition further comprises about 0.5 to about 2 weight percent of low density polyethylene. In some embodiments, the thermoplastic composition further comprises about 0.02 to about 0.5 weight percent of a copolymer of vinylidene fluoride and hexafluoropropylene, the copolymer having a fluorine content of about 60 to about 70 weight percent based on the total weight of the copolymer. In some embodiments, the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

The composition can, optionally, further include an impact modifier. Impact modifiers can be block copolymers containing alkenyl aromatic repeating units, for example, A-B diblock copolymers and A-B-A triblock copolymers having of one or two alkenyl aromatic blocks A (blocks having alkenyl aromatic repeating units), which are typically styrene blocks, and a rubber block, B, which is typically an isoprene or butadiene block. The butadiene block can be partially or completely hydrogenated. Mixtures of these diblock and triblock copolymers can also be used as well as mixtures of non-hydrogenated copolymers, partially hydrogenated copolymers, fully hydrogenated copolymers and combinations of two or more of the foregoing. A-B and A-B-A copolymers include, but are not limited to, polystyrene-polybutadiene, polystyrene-poly(ethylene-propylene) (SEP), polystyrene-polyisoprene, poly(α-methylstyrene)-polybutadiene, polystyrene-polybutadiene-polystyrene (SBS), polystyrene-poly(ethylene-butylene)-polystyrene (SEBS), polystyrene-poly(ethylene-propylene)-polystyrene, polystyrene-polyisoprene-polystyrene (SIS), poly(alpha-methylstyrene)-polybutadiene-poly(alpha-methylstyrene), polystyrene-poly(ethylene-propylene-styrene)-polystyrene, and the like.

Mixtures of the aforementioned block copolymers are also useful. Such A-B and A-B-A block copolymers are available commercially from a number of sources, including Phillips Petroleum under the trademark SOLPRENE, Kraton Polymers under the trademark KRATON, Dexco under the trademark VECTOR, Asahi Kasai under the trademark TUFTEC, Total Petrochemicals under the trademarks FINAPRENE and FINACLEAR, Dynasol under trademark CALPRENE, and Kuraray under the trademark SEPTON. In one embodiment, the impact modifier comprises polystyrene-poly(ethylene-butylene)-polystyrene, polystyrene-poly(ethylene-propylene) or a combination of the foregoing.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 weight percent, or, more specifically, less than 3 weight percent, or, even more specifically less than 2 weight percent, based on the total weight of the block copolymer. When the impact modifier comprises a carboxylic acid moiety the carboxylic acid moiety can be neutralized with an ion, preferably a metal ion such as zinc or sodium. It can be an alkylene-alkyl(meth)acrylate copolymer and the alkylene groups can have 2 to 6 carbon atoms and the alkyl group of the alkyl (meth)acrylate can have 1 to 8 carbon atoms. This type of polymer can be prepared by copolymerizing an olefin, for example, ethylene and propylene, with various (meth)acrylate monomers and/or various maleic-based monomers. The term (meth)acrylate refers to both the acrylate as well as the corresponding methacrylate analogue. Included within the term (meth)acrylate monomers are alkyl(meth)acrylate monomers as well as various (meth)acrylate monomers containing at least one of the aforementioned reactive moieties. In a one embodiment, the copolymer is derived from ethylene, propylene, or mixtures of ethylene and propylene, as the alkylene component; butyl acrylate, hexyl acrylate, or propyl acrylate as well as the corresponding alkyl(methyl)acrylates, for the alkyl(meth)acrylate monomer component, with acrylic acid, maleic anhydride, glycidyl methacrylate or a combination thereof as monomers providing the additional reactive moieties (i.e., carboxylic acid, anhydride, epoxy). Exemplary impact modifiers are commercially available from a variety of sources including DuPont under the trademarks ELVALOY PTW, SURLYN, and FUSABOND.

The impact modifiers can be used singly or in combination.

When present, the impact modifier can be used in an amount of about 1 to about 15 weight percent, based on the total weight of the thermoplastic composition. Within this range, the impact modifier can be present in an amount of about 1.5 to about 13 weight percent, specifically about 2 to about 12 weight percent, more specifically about 4 to about 10 weight percent.

In some embodiments, the thermoplastic composition comprises less than or equal to 1 weight percent, specifically less than or equal to 0.5 weight percent, more specifically less than or equal to 0.1 weight percent, of any impact modifiers. In some embodiments, the thermoplastic composition excludes impact modifiers.

In some embodiments, the thermoplastic composition comprises less than or equal to 0.5 weight percent, specifically less than or equal to 0.1 weight percent, of an unhydrogenated or hydrogenated block copolymer of an alkenyl aromatic compound and a conjugated diene. In this context, the weight percent upper limits represent the sum of unhydrogenated and hydrogenated block copolymer. In some embodiments, the thermoplastic composition excludes unhydrogenated and hydrogenated block copolymers of an alkenyl aromatic compound and a conjugated diene.

In some embodiments, the thermoplastic composition comprises less than or equal to 5 weight percent, specifically less than or equal to 3 weight percent, more specifically less than or equal to 1 weight percent, still more specifically less than or equal to 0.2 weight percent, of homopolystyrene. In some embodiments, the thermoplastic composition excludes homopolystyrene.

In some embodiments, the thermoplastic composition comprises less than or equal to 5 weight percent, specifically less than or equal to 3 weight percent, more specifically less than or equal to 1 weight percent, of a rubber-modified polystyrene. In some embodiments, the thermoplastic composition excludes rubber-modified polystyrene.

In some embodiments, the thermoplastic composition comprises less than or equal to 5 weight percent, specifically less than or equal to 3 weight percent, more specifically less than or equal to 1 weight percent, more specifically less than or equal to 0.2 weight percent, of any polymer other than the polyamide, the poly(arylene ether), and the polypropylene. In some embodiments, the thermoplastic composition excludes any polymer other than the polyamide, the poly(arylene ether), the polypropylene, up to 2 weight percent total of low density polyethylene and copolymer of vinylidene fluoride and hexafluoropropylene, and up to 0.05 weight percent of any polymeric surface-treating agent associated with glass fibers or hollow glass beads.

The thermoplastic composition can, optionally, further include one or more additives. Additives include, for example, stabilizers, mold release agents, processing aids, polyamide flow promoters (for example, low molecular weight polyolefins with or without epoxy functionality, low molecular weight ethylene-propylene rubbers, low molecular weight thermoplastic polyesters, and liquid polyolefin rubbers), poly(arylene ether) flow promoters (for example, low molecular weight homopolystyrenes, and low molecular weight rubber-modified polystyrenes), flame retardants, drip retardants, nucleating agents, UV blockers, dyes, pigments, antioxidants, anti-static agents, blowing agents, mineral oil, metal deactivators, antiblocking agents, nanoclays, electrically conductive agents, and combinations thereof.

In some embodiments, the thermoplastic composition excludes foaming agents and/or their residue. In some embodiments, the thermoplastic composition comprises less than 0.1 weight percent of or entirely excludes flame retardants. Flame retardants include, for example, brominated polymers (such as brominated polystyrene), metal dialkyl phosphinates (such as aluminum tris(diethylphosphinate)), metal hydroxides (such as magnesium hydroxide), and aromatic phosphate esters (such as resorcinol bis(diphenyl phosphate) and bisphenol A bis(diphenyl phosphate)).

Electrically conductive agents include, for example, electrically conductive carbon black, carbon nanotubes, carbon fibers, or a combination of two or more of the foregoing. Electrically conductive carbon blacks are commercially available and are sold under a variety of trade names, including but not limited to S.C.F. (Super Conductive Furnace), E.C.F. (Electric Conductive Furnace), KETJENBLACK EC (available from Akzo Co., Ltd.), PRINTEX XE2B (available from Degussa), ENSACO 350G (available from Timcal), and acetylene black. In some embodiments the electrically conductive carbon black has an average particle size less than or equal to 200 nanometers (nm), or, more specifically, less than or equal to 100 nm, or, even more specifically, less than or equal to 50 nm The electrically conductive carbon blacks can also have surface areas greater than 200 square meter per gram (m²/g), or, more specifically, greater than 400 m²/g, or, even more specifically, greater than 900 m²/g as determined by BET analysis. The electrically conductive carbon black can have a pore volume greater than or equal to 40 cubic centimeters per hundred grams (cm³/100 g), or, more specifically, greater than or equal to 100 cm³/100 g, or, even more specifically, greater than or equal to 150 cm³/100 g, as determined by dibutyl phthalate absorption. In some embodiments, the thermoplastic composition comprises electrically conductive agents in an amount of less than or equal to 0.3 weight percent of, specifically less than or equal to 0.2 weight percent, more specifically less than or equal to 0.1 weight percent, even more specifically less than or equal to 0.05 weight percent. In some embodiments, the thermoplastic composition excludes electrically conductive agents.

In some embodiments, the composition thermoplastic comprises a continuous phase comprising the polyamide and a disperse phase comprising the poly(arylene ether). The presence of such phases can be determined, for example, by microscopy using a phase-selective stain, such as ruthenium tetroxide or osmium tetroxide that selectively stains the poly (arylene ether) phase.

In a preferred embodiment of the method, the thermoplastic composition is extruded through the die at a temperature of about 280 to about 300° C.; the thermoplastic composition comprises about 40 to about 50 weight percent of the polyamide, about 35 to about 45 weight percent of the poly(arylene ether), about 7 to about 13 weight percent of the glass fibers, and about 1 to about 3 weight percent of the polypropylene; the polyamide comprises a polyamide-6,6; the poly(arylene ether) comprises a poly(2,6-dimethyl-1,4-phenylene ether) having an intrinsic viscosity of about 0.35 to about 0.46 deciliter per gram measured at 25° C. in chloroform; the polypropylene is a homopolypropylene having a weight average molecular weight of about 20,000 to about 500,000 atomic mass units; and the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

The thermoplastic composition is prepared by melt blending the polyamide, the poly(arylene ether), the polypropylene, the glass fibers, and any optional components. In some embodiments, the entire thermoplastic composition is compounded and pelletized, and the pellets are used for a subsequent profile extrusion process to form the insulation bar. In other embodiments, the thermoplastic composition is compounded and subjected to immediate profile extrusion, without intermediate pelletization. Detailed compounding conditions are described in the working examples below.

One embodiment is a profile-extruded article produced by any of the above-described methods.

Another embodiment is a thermoplastic composition, comprising: about 35 to about 55 weight percent of a polyamide, about 30 to about 50 weight percent of a poly(arylene ether), about 5 to about 15 weight percent of glass fibers, and about 0.5 to about 4 weight percent of a polypropylene; wherein all weight percents are based on the total weight of the thermoplastic composition unless a different weight basis is specified. All of the compositional variations described above in the context of the method apply as well to the composition itself.

In a preferred embodiment, the thermoplastic composition comprises about 40 to about 50 weight percent of the polyamide, about 35 to about 45 weight percent of the poly(arylene ether), about 7 to about 13 weight percent of the glass fibers, and about 1 to about 3 weight percent of the polypropylene; the polyamide comprises a polyamide-6,6; wherein the poly (arylene ether) comprises a poly(2,6-dimethyl-1,4-phenylene ether) having an intrinsic viscosity of about 0.35 to about 0.46 deciliter per gram measured at 25° C. in chloroform; the polypropylene is a homopolypropylene having a weight average molecular weight of about 20,000 to about 500,000 atomic mass units; and the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

Another embodiment is a profile-extruded article comprising any of the compositions described herein.

The invention includes at least the following embodiments.

Embodiment 1

A method of profile extrusion, comprising: extruding through a die a thermoplastic composition having a temperature of about 275 to about 310° C.; and cooling the extruded composition to form an extruded thermoplastic article; wherein the thermoplastic composition comprises the product of melt blending about 35 to about 55 weight percent of a polyamide, about 30 to about 50 weight percent of a poly (arylene ether), about 5 to about 15 weight percent of glass fibers, and about 0.5 to about 4 weight percent of a polypropylene; wherein all weight percents are based on the total weight of the thermoplastic composition unless a different weight basis is specified.

Embodiment 2

The method of embodiment 1, wherein the polypropylene is a homopolypropylene having a weight average molecular weight of at least 15,000 atomic mass units.

Embodiment 3

The method of embodiment 1 or 2, wherein the polyamide comprises a polyamide-6,6.

Embodiment 4

The method of any of embodiments 1-3, wherein the poly (arylene ether) comprises a poly(2,6-dimethyl-1,4-phenylene ether) having an intrinsic viscosity of about 0.35 to about 0.5 deciliter per gram measured at 25° C. in chloroform.

Embodiment 5

The method of any of embodiments 1-4, wherein the thermoplastic composition further comprises about 0.5 to about 2 weight percent of low density polyethylene.

Embodiment 6

The method of any of embodiments 1-4, wherein the thermoplastic composition further comprises about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 7

The method of any of embodiments 1-4, wherein the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 8

The method of any of embodiments 1-7, wherein the thermoplastic composition comprises less than or equal to 0.5 weight percent of an unhydrogenated or hydrogenated block copolymer of an alkenyl aromatic compound and a conjugated diene.

Embodiment 9

The method of any of embodiments 1-8, wherein the thermoplastic composition comprises less than or equal to 5 weight percent of homopolystyrene.

Embodiment 10

The method of any of embodiments 1-9, wherein the thermoplastic composition comprises less than or equal to 1 weight percent of impact modifiers.

Embodiment 11

The method of any of embodiments 1-10, wherein the thermoplastic composition comprises less than or equal to 0.3 weight percent of electrically conductive agents.

Embodiment 12

The method of any of embodiments 1-11, wherein the composition thermoplastic comprises a continuous phase comprising the polyamide and a disperse phase comprising the poly(arylene ether).

Embodiment 13

The method of embodiment 1, wherein the thermoplastic composition is extruded through the die at a temperature of about 280 to about 300° C.; wherein the thermoplastic composition comprises about 40 to about 50 weight percent of the polyamide, about 35 to about 45 weight percent of the poly(arylene ether), about 7 to about 13 weight percent of the glass fibers, and about 1 to about 3 weight percent of the polypropylene; wherein the polyamide comprises a polyamide-6,6; wherein the poly(arylene ether) comprises a poly(2,6-dimethyl-1,4-phenylene ether) having an intrinsic viscosity of about 0.35 to about 0.46 deciliter per gram measured at 25° C. in chloroform; wherein the polypropylene is a homopolypropylene having a weight average molecular weight of about 20,000 to about 500,000 atomic mass units; and wherein the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 14

A profile-extruded article produced by the method of any of embodiments 1-13.

Embodiment 15

A thermoplastic composition, comprising: about 35 to about 55 weight percent of a polyamide, about 30 to about 50 weight percent of a poly(arylene ether), about 5 to about 15 weight percent of glass fibers, and about 0.5 to about 4 weight percent of a polypropylene; wherein all weight percents are based on the total weight of the thermoplastic composition unless a different weight basis is specified.

Embodiment 16

The thermoplastic composition of embodiment 15, wherein the polypropylene is a homopolypropylene having a weight average molecular weight of at least 15,000 atomic mass units.

Embodiment 17

The thermoplastic composition of embodiment 15 or 16, wherein the polyamide comprises a polyamide-6,6.

Embodiment 18

The thermoplastic composition of any of embodiments 15-17, wherein the poly(arylene ether) comprises a poly(2,6-dimethyl-1,4-phenylene ether) having an intrinsic viscosity of about 0.35 to about 0.5 deciliter per gram measured at 25° C. in chloroform.

Embodiment 19

The thermoplastic composition of any of embodiments 15-18, further comprising about 0.5 to about 2 weight percent of low density polyethylene.

Embodiment 20

The thermoplastic composition of any of embodiments 15-18, further comprising about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 21

The thermoplastic composition of any of embodiments 15-18, further comprising about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 22

The thermoplastic composition of any of embodiments 15-21, comprising less than or equal to 0.5 weight percent of an unhydrogenated or hydrogenated block copolymer of an alkenyl aromatic compound and a conjugated diene.

Embodiment 23

The thermoplastic composition of any of embodiments 15-22, comprising less than or equal to 5 weight percent of homopolystyrene.

Embodiment 24

The thermoplastic composition of any of embodiments 15-23, comprising less than or equal to 1 weight percent of impact modifiers.

Embodiment 25

The thermoplastic composition of any of embodiments 15-24, comprising less than or equal to 0.3 weight percent of electrically conductive agents.

Embodiment 26

The thermoplastic composition of any of embodiments 15-25, comprising a continuous phase comprising the polyamide and a disperse phase comprising the poly(arylene ether).

Embodiment 27

The thermoplastic composition of embodiment 15, wherein the thermoplastic composition comprises about 40 to about 50 weight percent of the polyamide, about 35 to about 45 weight percent of the poly(arylene ether), about 7 to about 13 weight percent of the glass fibers, and about 1 to about 3 weight percent of the polypropylene; wherein the polyamide comprises a polyamide-6,6; wherein the poly(arylene ether) comprises a poly(2,6-dimethyl-1,4-phenylene ether) having an intrinsic viscosity of about 0.35 to about 0.46 deciliter per gram measured at 25° C. in chloroform; wherein the polypropylene is a homopolypropylene having a weight average molecular weight of about 20,000 to about 500,000 atomic mass units; and wherein the thermoplastic composition further comprises about 0.5 to about 2 weight percent of low density polyethylene and about 0.02 to about 0.5 weight percent of a copolymer of vinylidene fluoride and hexafluoropropylene, the copolymer having a fluorine content of about 60 to about 70 weight percent based on the total weight of the copolymer.

Embodiment 28

A profile-extruded article comprising the composition of any of embodiments 15-27.

The invention is further illustrated by the following non-limiting examples.

Examples 1 and 2, Comparative Examples 1 and 2

These examples illustrate the reduced beard growth observed during profile extrusion when the extruded polyamide-poly(arylene ether) composition comprises a small amount of polypropylene.

Components used to form the compositions are described in Table 1.

TABLE 1

| Component | Description |
|---|---|
| PA-6 | Polyamide-6, CAS Reg. No. 25038-54-4, having an intrinsic viscosity of about 120 milliliters per gram measured at 25° C. in 96% sulfuric acid according to ISO 307: 2007, and an amine end group concentration of about 100 milliequivalents/gram; obtained as PA6 RAD S24 from Radici Fil. |
| PA-66 | Polyamide-6,6, CAS Reg. No. 32131-17-2, having an intrinsic viscosity of about 333 milliliters per gram measured at 25° C. in 96% sulfuric acid according to ISO 307: 2007, and an amine end group concentration of about 39 milliequivalents/gram; obtained as STABAMID A302NH from Rhodia. |
| PPE 0.53 IV | Poly(2,6-dimethyl-1,4-phenylene ether), CAS Reg. No. 25134-01-4, having an intrinsic viscosity of 0.53 deciliter per gram as measured in chloroform at 25° C.; obtained in powder form as PPO 805 from SABIC Innovative Plastics. |
| PPE 0.46 IV | Poly(2,6-dimethyl-1,4-phenylene ether), CAS Reg. No. 25134-01-4, having an intrinsic viscosity of 0.46 deciliter per gram as measured in chloroform at 25° C.; obtained in powder form as PPO 800 from SABIC Innovative Plastics. |
| PPE 0.40 IV | Poly(2,6-dimethyl-1,4-phenylene ether), CAS Reg. No. 25134-01-4, having an intrinsic viscosity of 0.40 deciliter per gram as measured in chloroform at 25° C.; obtained in powder form as PPO 803 from SABIC Innovative Plastics. |
| PP | Polypropylene, CAS Reg. No. 9003-07-0, having a melt mass flow index of about 1-2 grams per 10 minutes measured at 230° C. and 2.16 kilogram load, and a weight average molecular weight of about 170,000 atomic mass units; obtained as SABIC PP 505P from SABIC Europe. |
| Citric acid | Citric acid, CAS Reg. No. 77-92-9. |
| KI solution | Potassium iodide, CAS Reg. No. 7681-11-0, provided as a 50 weight percent aqueous solution. |
| CuI | Cuprous iodide, CAS Reg. no. 7681-65-4 |
| Carbon black | Carbon black having an iodine number of about 121 milligram per gram measured according to ASTM D1510, an oil absorption number of about 114 cubic centimeters per 100 grams measured according to ASTM D2414, and a density of about 345 kilogram per cubic meter measured according to ASTM D1513; obtained as ELFTEX 570 from Cabot Corporation. |
| Non-bonding glass fiber | Glass fiber having a diameter of about 14 micrometers and a proprietary coating; obtained as CS 108F-14P from 3B Fibreglass. |
| Hydrostable glass fiber | Glass fiber having a diameter of about 10 micrometers and a proprietary coating; obtained as DS 1128-10N from 3B Fibreglass. |

TABLE 1-continued

| Component | Description |
| --- | --- |
| Glass-filled PA-66 | A blend of 75 weight percent PA-66 and 25 weight percent glass fibers; obtained from Joma. |
| FP/LDPE | A fluoropolymer masterbatch consisting of 95 weight percent low density polyethylene (obtained as PA0833 LD from Constab Polymer-chemie GmbH&Co.) and 5 weight percent Dynamar FX 9613 from Dyneon; Dynamar FX 9613 consists of 88-92 weight percent poly(vinylidene fluoride-co-hexafluoropropylene) having a fluorine content of 65.9 ± 0.3% and a Mooney viscosity of 33 ± 5, 4-9 weight percent talc, 1-4 weight percent synthetic amorphous silica, and <5% calcium carbonate. |
| Epoxy polymer | An epoxy polymer having a weight average molecular weight of about 6800 and an epoxy equivalent weight of about 285 grams per mole, obtained as JONCRYL ADR 4368S from BASF. |
| Calcium soaps | Calcium salts of partially saponified fatty acid esters of polyfunctional alcohols; obtained as LOXIOL G 78 from Cognis Oleochemicals. |
| Aluminum silicate | Aluminum silicate, CAS Reg. No. 12141-46-7, obtained as PERLITE EUROPERL 60 from IMERYS Performance Materials. |

Four compositions, two inventive and two comparative, were prepared using the components and amounts (expressed in weight percent) summarized in Table 2. All compositions were prepared by extrusion using a 28 millimeter internal diameter, co-rotating, three-lobe extruder from Werner & Pfleiderer. The extruder temperature varied from 240° C. at the intake zone to 310° C. at the die with intermediate zones having temperatures of 280 to 300° C. The throughput rate was about 10 to about 15 kilograms per hour at a screw speed of 300 rotations per minute. The extruded composition was pelletized and dried for four hours at 130° C. before being profile extruded. Profile extrusion was conducted on a 60 millimeter profile extruder with barrel temperatures of about 290° C. The profile extruder was operated at 40 rotations per minute.

Figure 1:
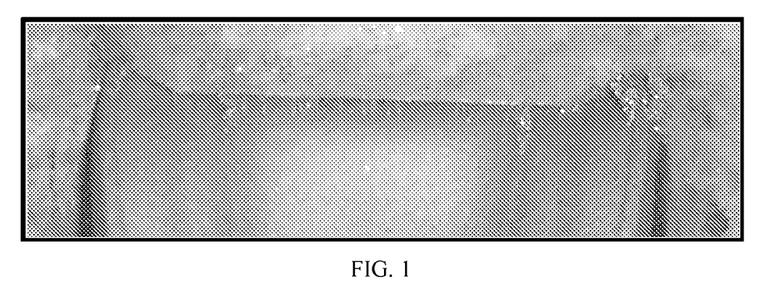
FIG. 1 is an image illustrating "low" beard growth; the extruded composition corresponds to Example 1.
Figure 2:
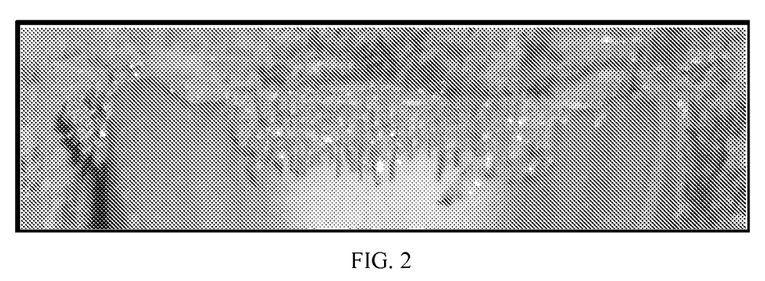
FIG. 2 is an image illustrating "high" beard growth; the extruded composition corresponds to Comparative Example 2.

For each profile extrusion, "beard growth" or material build-up at the die face was monitored visually after 30 minutes of continuous extrusion and characterized as low, medium, or high, with less beard growth being more desirable. "High" beard growth would require the profile extruder to be stopped and cleaned approximately once per hour. "Medium" beard growth would require the profile extruder to be stopped and cleaned approximately once every two to four hours. "Low" beard growth would require the profile extruder to be stopped and cleaned approximately once every six to twelve hours, or less often. The Example 1 and 2 compositions incorporating polypropylene exhibited low beard growth, whereas the Comparative Example 1 and 2 compositions without polypropylene exhibited high beard growth. FIG. 1, corresponding to Example 1, is an image showing low beard growth. FIG. 2, corresponding to Comparative Example 2, is an image showing high beard growth. In FIGS. 1 and 2, the beard growth is the matter protruding down from the die lip over the extruded part. The addition of polypropylene thus has an unexpected and practical advantage of reducing process down time to clean the profile extruder.

TABLE 2

| | Ex. 1 | C. Ex. 1 | Ex. 2 | C. Ex. 2 |
| --- | --- | --- | --- | --- |
| COMPOSITIONS | | | | |
| PPE 0.53 IV | 0 | 41.83 | 39.89 | 0 |
| PPE 0.40 IV | 40.83 | 0 | 0 | 41.89 |
| Citric acid | 0.40 | 0.40 | 0.40 | 0.40 |
| KI solution | 0.20 | 0.20 | 0.20 | 0.20 |
| CuI | 0.07 | 0.07 | 0.01 | 0.01 |
| Carbon black | 1.50 | 1.50 | 1.50 | 1.50 |
| FP/LDPE | 1.00 | 1.00 | 1.00 | 1.00 |
| PP | 1.00 | 0 | 2.00 | 0 |
| Hydrostable glass fiber | 10.00 | 10.00 | 10.00 | 10.00 |
| PA-66 | 45.00 | 45.00 | 45.00 | 45.00 |
| PROPERTY | | | | |
| Beard growth | low | high | low | medium |

Comparative Examples 3-15

These comparative examples illustrate alternative approaches that were not successful in reducing beard growth to a low level. The compositions used were all variations on the Comparative Example 1 composition in Table 2, above. Where the concentration of one component was changed, the concentrations of all other components were changed proportionally to compensate.

In Comparative Example 3, the citric acid content was increased from 0.40 weight percent to 0.70 weight percent. The beard growth was high and approximately the same as that for Comparative Example 1.

In Comparative Example 4, the content of the fluoropolymer masterbatch designated FP/LDPE was increased from 1.0 to 2.0 weight percent. The beard growth was high and approximately the same as that for Comparative Example 1.

In Comparative Example 5, the carbon black content was decreased from 0.1 to 0.05 weight percent. The beard growth was high and approximately the same as that for Comparative Example 1.

In Comparative Example 6, the polyamide-6,6 of Comparative Example 1 was replaced with the polyamide-6 designated PA-6 in Table 1. The beard growth was high and approximately the same as that for Comparative Example 1.

In Comparative Example 7, the polyamide-6,6 of Comparative Example 1 was replaced with the polyamide-6 designated PA-6 in Table 1, and the citric acid content was increased from 0.40 to 0.70 weight percent. The beard growth was high and approximately the same as that for Comparative Example 1.

In Comparative Example 8, 0.1 weight percent of the component designated "Calcium soaps" in Table 1 was added. The beard growth was high and approximately the same as that for Comparative Example 1.

In Comparative Example 9, 0.5 weight percent of the component designated "Epoxy polymer" in Table 1 was added, and the polyamide-6,6 employed had a viscosity of about 145 milliliters per gram measured at 25° C. in 96% sulfuric acid according to ISO 307:2007, and an amine end group concentration of about 44 milliequivalents/gram obtained as STABAMID 26FE1 from Rhodia. The beard growth was high and approximately the same as that for Comparative Example 1.

In Comparative Example 10, the poly(arylene ether) intrinsic viscosity was decreased from 0.53 deciliter per gram to 0.46 deciliter per gram (i.e., the component designated "PPE 0.53 IV" in Table 1 was replaced with the component designated "PPE 0.46 IV"). The beard growth was medium (i.e., improved relative to that of Comparative Example 1, but not as good as those of polypropylene-containing Examples 1 and 2).

In Comparative Example 11, the poly(arylene ether) intrinsic viscosity was decreased from 0.53 deciliter per gram to 0.40 deciliter per gram (i.e., the component designated "PPE 0.53 IV" in Table 1 was replaced with the component designated "PPE 0.40 IV"). The beard growth was medium (i.e., improved relative to that of Comparative Example 1, but not as good as those of polypropylene-containing Examples 1 and 2).

In Comparative Example 12, a masterbatch of 25% glass fibers in polyamide-6,6 was substituted for the glass fibers and most of the polyamide-6,6 of Comparative Example 1. The beard growth was high and worse than that of Comparative Example 1.

In Comparative Example 13, the component designated "Non-bonding glass fiber" in Table 1 was substituted for the component designated "Glass fiber". The beard growth was high and approximately the same as that for Comparative Example 1.

In Comparative Example 14, the component designated "FP/LDPE" in Table 1 was omitted. The beard growth was high and worse than that of Comparative Example 1.

In Comparative Example 15, 0.1 weight percent of the component designated "Aluminum silicate" in Table 1 was added at the feed throat of the profile extruder. The beard growth was high and approximately the same as that for Comparative Example 1.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of profile extrusion, comprising:
    extruding through a die a thermoplastic composition having a temperature of about 275 to about 310° C.; and
    cooling the extruded composition to form an extruded thermoplastic article;
    wherein the thermoplastic composition comprises the product of melt blending
        about 35 to about 55 weight percent of a polyamide,
        about 30 to about 50 weight percent of a poly(arylene ether),
        about 5 to about 15 weight percent of glass fibers,
        about 0.5 to about 4 weight percent of a polypropylene, and
        one or both of
            about 0.5 to about 2 weight percent of low density polyethylene, and
            about 0.02 to about 0.5 weight percent of a copolymer of vinylidene fluoride and hexafluoropropylene, the copolymer having a fluorine content of about 60 to about 70 weight percent based on the total weight of the copolymer;
    wherein all weight percents are based on the total weight of the thermoplastic composition unless a different weight basis is specified.

2. The method of claim 1, wherein the polypropylene is a homopolypropylene having a weight average molecular weight of at least 15,000 atomic mass units.

3. The method of claim 1, wherein the polyamide comprises a polyamide-6,6.

4. The method of claim 1, wherein the poly(arylene ether) comprises a poly(2,6-dimethyl-1,4-phenylene ether) having an intrinsic viscosity of about 0.35 to about 0.5 deciliter per gram measured at 25° C. in chloroform.

5. The method of claim 1, wherein the thermoplastic composition comprises the low density polyethylene.

6. The method of claim 1, wherein the thermoplastic composition comprises the copolymer of vinylidene fluoride and hexafluoropropylene.

7. The method of claim 1, wherein the thermoplastic composition comprises the low density polyethylene and the copolymer of vinylidene fluoride and hexafluoropropylene.

8. The method of claim 1, wherein the thermoplastic composition comprises less than or equal to 0.5 weight percent of an unhydrogenated or hydrogenated block copolymer of an alkenyl aromatic compound and a conjugated diene.

9. The method of claim 1, wherein the thermoplastic composition comprises less than or equal to 5 weight percent of homopolystyrene.

10. The method of claim 1, wherein the thermoplastic composition comprises less than or equal to 1 weight percent of impact modifiers.

11. The method of claim 1, wherein the thermoplastic composition comprises less than or equal to 0.3 weight percent of electrically conductive agents.

12. The method of claim 1, wherein the composition thermoplastic comprises a continuous phase comprising the polyamide and a disperse phase comprising the poly(arylene ether).

13. The method of claim 1,
    wherein the thermoplastic composition is extruded through the die at a temperature of about 280 to about 300° C.;

wherein the thermoplastic composition comprises
about 40 to about 50 weight percent of the polyamide,
about 35 to about 45 weight percent of the poly(arylene ether),
about 7 to about 13 weight percent of the glass fibers,
about 1 to about 3 weight percent of the polypropylene,
about 0.5 to about 2 weight percent of the low density polyethylene, and
about 0.02 to about 0.5 weight percent of the copolymer of vinylidene fluoride and hexafluoropropylene;
wherein the polyamide comprises a polyamide-6,6;
wherein the poly(arylene ether) comprises a poly(2,6-dimethyl-1,4-phenylene ether) having an intrinsic viscosity of about 0.35 to about 0.46 deciliter per gram measured at 25° C. in chloroform; and
wherein the polypropylene is a homopolypropylene having a weight average molecular weight of about 20,000 to about 500,000 atomic mass units.

14. A profile-extruded article produced by the method of claim 1.

15. A thermoplastic composition, comprising:
about 35 to about 55 weight percent of a polyamide,
about 30 to about 50 weight percent of a poly(arylene ether),
about 5 to about 15 weight percent of glass fibers,
about 0.5 to about 4 weight percent of a polypropylene, and
one or both of
about 0.5 to about 2 weight percent of low density polyethylene, and
about 0.02 to about 0.5 weight percent of a copolymer of vinylidene fluoride and hexafluoropropylene, the copolymer having a fluorine content of about 60 to about 70 weight percent based on the total weight of the copolymer;
wherein all weight percents are based on the total weight of the thermoplastic composition unless a different weight basis is specified.

16. The thermoplastic composition of claim 15, wherein the polypropylene is a homopolypropylene having a weight average molecular weight of at least 15,000 atomic mass units.

17. The thermoplastic composition of claim 15, wherein the polyamide comprises a polyamide-6,6.

18. The thermoplastic composition of claim 15, wherein the poly(arylene ether) comprises a poly(2,6-dimethyl-1,4-phenylene ether) having an intrinsic viscosity of about 0.35 to about 0.5 deciliter per gram measured at 25° C. in chloroform.

19. The thermoplastic composition of claim 15, comprising the low density polyethylene.

20. The thermoplastic composition of claim 15, comprising the copolymer of vinylidene fluoride and hexafluoropropylene.

21. The thermoplastic composition of claim 15, comprising the low density polyethylene and the copolymer of vinylidene fluoride and hexafluoropropylene.

22. The thermoplastic composition of claim 15, comprising less than or equal to 0.5 weight percent of an unhydrogenated or hydrogenated block copolymer of an alkenyl aromatic compound and a conjugated diene.

23. The thermoplastic composition of claim 15, comprising less than or equal to 5 weight percent of homopolystyrene.

24. The thermoplastic composition of claim 15, comprising less than or equal to 1 weight percent of impact modifiers.

25. The thermoplastic composition of claim 15, comprising less than or equal to 0.3 weight percent of electrically conductive agents.

26. The thermoplastic composition of claim 15, comprising a continuous phase comprising the polyamide and a disperse phase comprising the poly(arylene ether).

27. The thermoplastic composition of claim 15,
wherein the thermoplastic composition comprises
about 40 to about 50 weight percent of the polyamide,
about 35 to about 45 weight percent of the poly(arylene ether),
about 7 to about 13 weight percent of the glass fibers, and
about 1 to about 3 weight percent of the polypropylene,
about 0.5 to about 2 weight percent of the low density polyethylene, and
about 0.02 to about 0.5 weight percent of the copolymer of vinylidene fluoride and hexafluoropropylene;
wherein the polyamide comprises a polyamide-6,6;
wherein the poly(arylene ether) comprises a poly(2,6-dimethyl-1,4-phenylene ether) having an intrinsic viscosity of about 0.35 to about 0.46 deciliter per gram measured at 25° C. in chloroform; and
wherein the polypropylene is a homopolypropylene having a weight average molecular weight of about 20,000 to about 500,000 atomic mass units.

28. A profile-extruded article comprising the composition of claim 15.

* * * * *